United States Patent
Sawicki et al.

(10) Patent No.: US 11,018,568 B2
(45) Date of Patent: May 25, 2021

(54) SERVOVALVE WITH ADJUSTABLE AIR GAPS

(71) Applicant: Hamilton Sundstrand Corporation, Charlotte, NC (US)

(72) Inventors: Piotr Sawicki, Bogdaniec (PL); Marcin Cis, Lutynia (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 112 days.

(21) Appl. No.: 16/208,963

(22) Filed: Dec. 4, 2018

(65) Prior Publication Data
US 2019/0280580 A1 Sep. 12, 2019

(30) Foreign Application Priority Data

Mar. 8, 2018 (EP) ..................................... 18461529

(51) Int. Cl.
*H02K 26/00* (2006.01)
*H01F 7/14* (2006.01)
*F15B 13/043* (2006.01)
*H02K 1/08* (2006.01)
*H02K 15/06* (2006.01)

(52) U.S. Cl.
CPC .......... *H02K 26/00* (2013.01); *F15B 13/0438* (2013.01); *H01F 7/145* (2013.01); *H02K 1/08* (2013.01); *H02K 15/061* (2013.01); *H02K 15/062* (2013.01); *H02K 2201/03* (2013.01); *H02K 2213/09* (2013.01)

(58) Field of Classification Search
CPC ..................................................... H02K 26/00
See application file for complete search history.

(56) References Cited

U.S. PATENT DOCUMENTS

| | | | |
|---|---|---|---|
| 3,058,038 A * | 10/1962 | Stedman, Jr. | ....... F15B 13/0438 335/229 |
| 3,712,339 A | 1/1973 | Bartholomaus et al. | |
| 5,344,702 A | 9/1994 | Haubs et al. | |
| 5,473,298 A | 12/1995 | Teutsch | |
| 5,679,989 A | 10/1997 | Buscher et al. | |
| 2017/0214305 A1 | 7/2017 | Tranovich et al. | |

FOREIGN PATENT DOCUMENTS

| | | |
|---|---|---|
| CN | 106640804 A | 5/2017 |
| CN | 206309696 U | 7/2017 |
| DE | 875064 C | 4/1953 |
| EP | 2922071 A1 | 9/2015 |

OTHER PUBLICATIONS

Extended European Search Report for International Application No. 18461529.2 dated Sep. 14, 2018, 8 pages.

* cited by examiner

*Primary Examiner* — Ramon M Barrera
(74) *Attorney, Agent, or Firm* — Cantor Colburn LLP

(57) ABSTRACT

A torque motor for a servovalve is provided, the torque motor comprising an armature and a first pole piece. The first pole piece has a first portion and a second portion that is selectively moveable relative to the first portion such that a size of an air gap formed between the second portion and the armature is adjusted in response to the movement of the second portion relative to the first portion.

16 Claims, 6 Drawing Sheets

SERVOVALVE WITH ADJUSTABLE AIR GAPS

FOREIGN PRIORITY

This application claims priority to European Patent Application No. 18461529.2 filed Mar. 8, 2018, the entire contents of which is incorporated herein by reference.

BACKGROUND OF THE INVENTION

Flow control in a flapper-nozzle servo valve relies on the movement of a flapper between two nozzles. The movement is as a result of the rotation of an armature and the rotation of the armature is provided by a torque motor, which is controlled by current applied to a coil. A proper characteristic of the movement (stroke of a flapper) versus the current in a coil is mandatory.

One of the main parameters which has an influence on the performance of a torque motor is the value of the air gap between the pole piece and the armature. Currently, in some applications, the pole piece is one solid and the air gap is provided by Electrical Discharge Machining (EDM). This process is very time-consuming and expensive. The risk of fall out debris is high and the operator of the EDM process must be highly skilled.

In other applications, the position of the armature between pole pieces is set by adjusting the position of the pole pieces and/or adjusting of the position of the armature (for example, by using a null bias spring).

SUMMARY OF THE INVENTION

In one example, there is provided a torque motor for a servovalve, the torque motor including an armature and a first pole piece. The first pole piece has a first portion and a second portion that is selectively moveable relative to the first portion such that a size of an air gap formed between the second portion and the armature is adjusted in response to the movement of the second portion relative to the first portion.

Preferably, the torque motor may further comprise a second pole piece and the armature may be disposed between the first pole piece and the second pole piece. The first pole piece may further comprise a first pole piece section with a ring shape extending in a plane, and the first portion may extend perpendicularly away from the first pole piece section to an angled disposed at an angle relative to the plane. Further, the second portion can have a first surface disposed at the same angle as the angled surface and a second surface substantially parallel to the plane. The first surface of the second portion may be releasably coupled to the angled surface.

Preferably, a first surface of the armature and the second surface of the second portion between which the air gap 116a, 116c) is defined may remain substantially parallel throughout a range of relative movement between the first portion and the second portion.

Further, movement of the second portion relative to the first portion may be in a direction parallel to the first surface.

Preferably, the angled surfaces may be disposed at an angle of between 5° and 25° to the plane.

Further, the torque motor may further comprise attachment means configured to attach the second portion to the first portion, and preferably may further comprise retaining means secured onto the attachment means to secure the second portion to the first pole piece section and even more preferably the attachment means may be a screw and the retaining means can be a nut.

Further, the first pole piece section and the first portion may further comprise an opening and the second portion may further comprise an opening, and wherein the attachment means can be provided through the opening in the first pole piece section and the first portion, and the opening in the second portion. Preferably, the opening in the first pole piece section may be a slot to provide an area for movement of the attachment means, and the opening in the second portion may have the same diameter as the attachment means, such that the attachment means may be flush with the opening of the second portion.

In another example, a method of adjusting an air gap in a torque motor is provided. The method comprises providing an armature and providing a first pole piece. The first pole piece has a first portion and a second portion. The method further comprises selectively moving the second portion relative to the first portion such that a size of an air gap formed between the second portion and the armature is adjusted in response to the movement of the second portion relative to the first portion.

Preferably, the method may further comprise providing a second pole piece, and disposing the armature between the first pole piece and the second pole piece.

The first pole piece may further comprise a first pole piece section with a ring shape extending in a plane, and the first portion may extend perpendicularly away from the first pole piece section to an angled surface that may be disposed at an angle relative to the plane. The second portion may have a first surface disposed at the same angle as the angled surface and a second surface that may be substantially parallel to the plane. Further, the method may also include coupling the first surface of the second portion to the angled surface.

Further, a first surface of the armature and the second surface of the second portion between which the air gap may be defined can remain substantially parallel throughout a range of relative movement between the first portion and the second portion.

The method may also comprise moving the second portion relative to the first portion in a direction parallel to the first surface. The angled surfaces may be disposed at an angle of between 5° and 25° to the plane.

Preferably, the method may also further comprise providing attachment means to attach the second portion to the first portion and preferably, the method may also further comprise tightening a retaining means onto the attachment means for securing the second portion to the first portion.

Further, the first pole piece section and first portion may further comprise an opening and the second portion may further comprise an opening. The method may further comprise providing the attachment means through the opening in the first pole piece section and the first portion, and the opening in the second portion. Preferably, the opening in the first pole piece section and first section can be a slot providing an area for movement of the attachment means, and the opening in the second portion may have the same diameter as the attachment means such that the attachment means may be flush with the opening of the second portion.

Further, the method may also comprise loosening the attachment means and the retaining means, moving the second portion in a direction parallel to the plane, and therefore moving the attachment means within the opening to result in an adjustment of the air gap. Further, the method may also comprise tightening the attachment means and the retaining means, thereby securing the second portion in position in relation to the first portion.

DETAILED DESCRIPTION OF THE INVENTION

Figure 1:
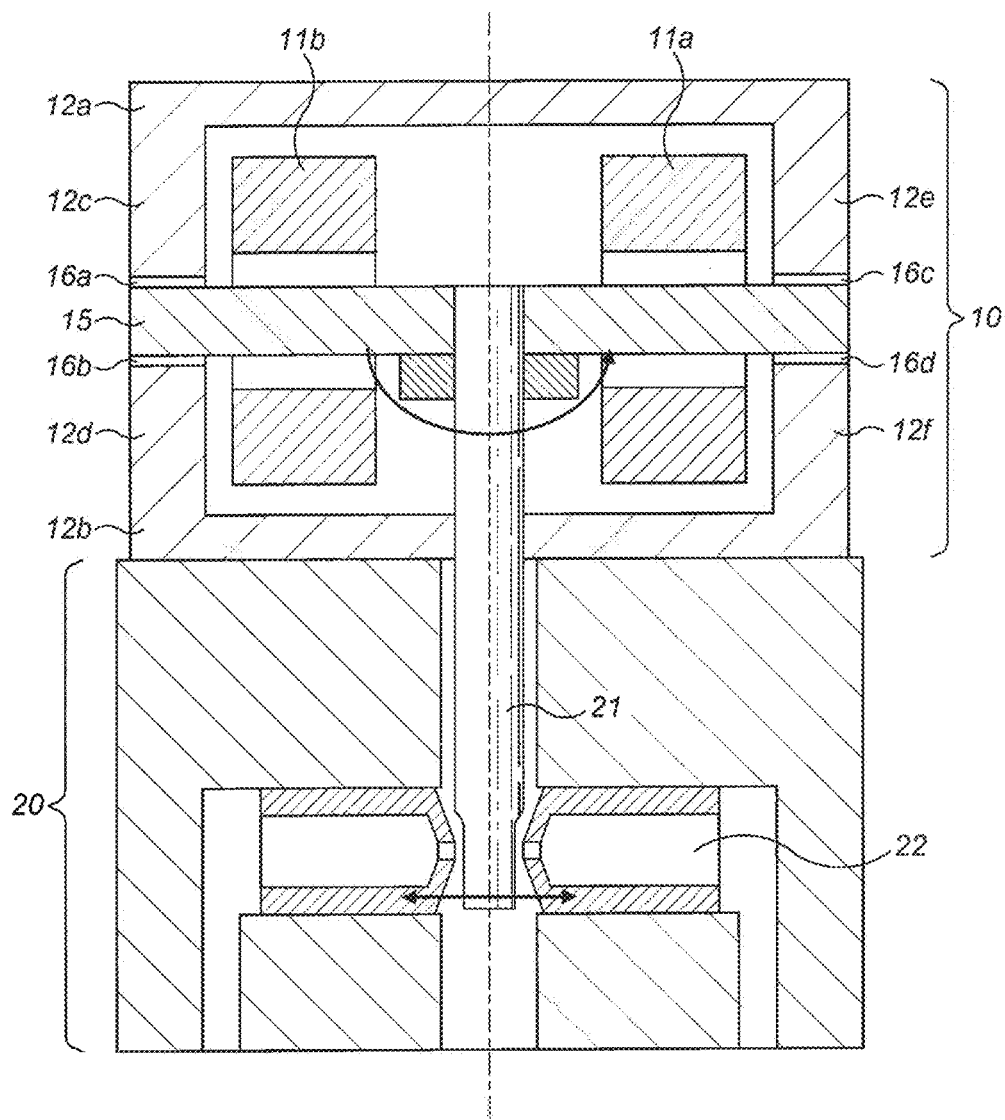
FIG. 1 shows a side cross sectional view of a known servovalve.

FIG. 1 depicts a side cross sectional view of a known servovalve comprising torque motor 10 and a nozzle 20. The torque motor 10 comprises first and second magnetic coils 11a, 11b, first and second pole pieces 12a, 12b, and armature 15 located between the first and second pole pieces 12a, 12b. The flapper nozzle servovalve 20 comprises flapper 21 coupled at one end to the armature 15, and nozzle 22.

First and second pole pieces 12a and 12b each have a "C-shaped" cross section, each with a ring shaped section extending in a first plane, and further comprise first portions 12c, 12d, and second portions 12e, 12f extending perpendicularly away from the first plane. The first and second portions of each pole piece extend from the ring section of the pole piece in the same direction, as seen in FIG. 1. Upon assembly, the first and second pole pieces 12a, 12b are arranged so that the perpendicularly extending first and second portions face each other. The armature 15 is positioned between the perpendicularly extending portions of the first and second pole pieces and air gaps 16a-16d are provided between the armature and the first and second portion 12c-12f of each pole piece.

First and second magnetic coils 11a, 11b are disposed around armature 15. When a current is applied to the coils 11a, 11b, a magnetic flux acting on the ends of the armature is developed. The magnetic flux will cause the ends of the armature 15 to be attracted to the pole pieces 12a, 12b, causing a movement in the armature 15, and therefore the flapper 21.

The magnitude of air gaps 16a-16d has a profound effect on the performance of the torque motor 10, and therefore proper calibration of these air gaps 16a-16d is crucial. A small mismatch between the magnitudes of the air gaps 16a-16d can cause the null position of the armature 15 to not be centred. In such a case, a "null current" must be applied in order to restore the position of the armature to the centred position. Whilst in some cases this is undesirable, in other cases it may be so desired to provide mismatched air gaps 16a-16d, and therefore provide a non-zero null position of the armature 15. A sum of the opposite air gaps (e.g. 16a+16d and 16b+16c) determines characteristic stroke of the armature versus current applied to the coils.

Figure 2:
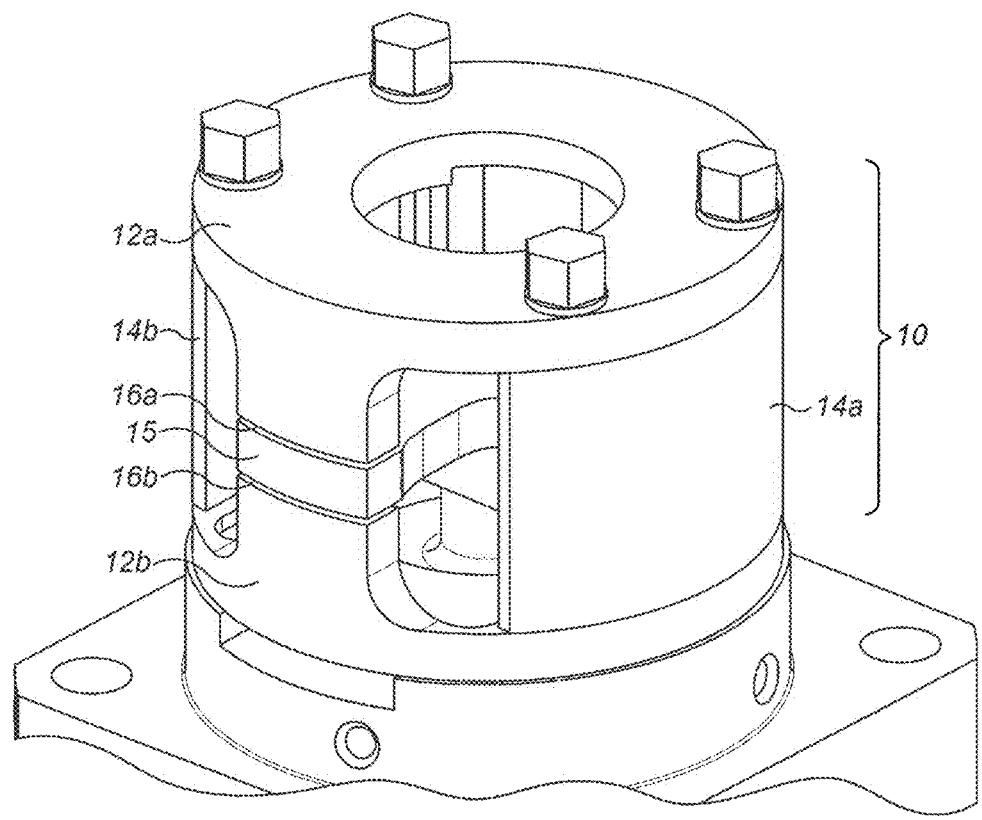
FIG. 2 shows a perspective view of a known torque motor.

FIG. 2 depicts a perspective view of a known torque motor 10. The same features of torque motor 10 are indicated with the same reference numerals as FIG. 1. As can be seen in FIG. 2, torque motor 10 is also provided with first and second permanent magnets 14a, 14b disposed between the ring shaped sections of the first and second pole pieces 12a, 12b.

Figure 3:
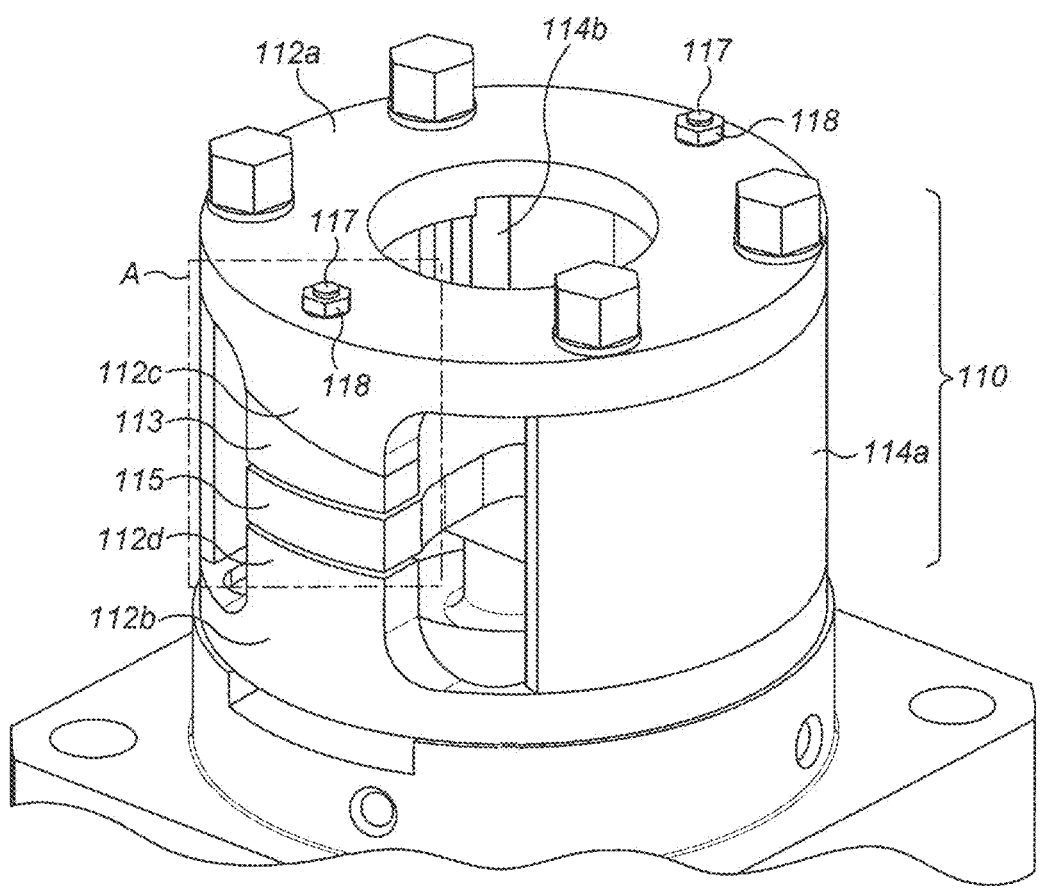
FIG. 3 shows a perspective view of an example of a new type of torque motor as described herein.

FIG. 3 depicts a perspective view of an example of a servo valve torque motor apparatus 110. The torque motor 110 comprises first and second magnetic coils (not shown), first and second pole pieces 112a, 112b, first and second permanent magnets 114a, 114b, armature 115, attachment means 117 and retaining means 118.

Figure 4:
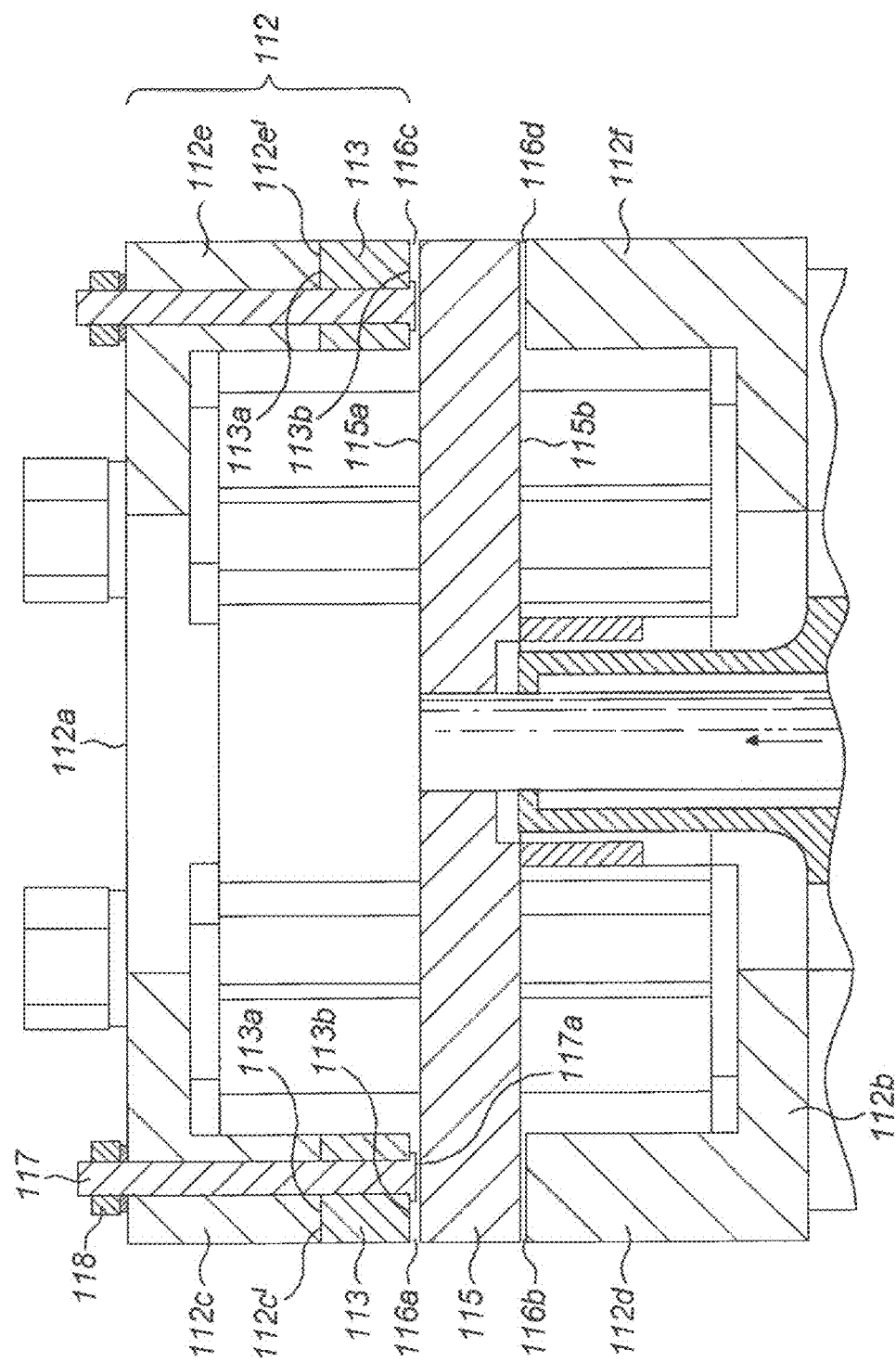
FIG. 4 shows a side view cross section of a torque motor as described herein, depicting air gaps between the pole pieces and the armature.

First pole piece section 112a has a "C-shaped" cross section, with a ring shape extending in a first plane, and further comprises first portions 112c and 112e extending perpendicularly away from the first plane, as seen in FIG. 4. The first portions 112c, 112e of the first pole piece section 112a extend from the first plane to angled surfaces 112c' and 112e', which are disposed at an angle to the first pole piece section 112a. Preferably, the angled surfaces 112c' and 112e' are angled between 5° and 25° to the first plane.

There are also provided second portions 113 that are moveable relative to the first portions 112c, 112e so as to adjust the magnitude of a corresponding air gap 116a, 116c between the second portion 113 and the armature 115. The second portions 113 have first surfaces 113a that may have the same angle to a corresponding angled surface 112c', 112e' of the first pole piece section 112a. The second portions 113 extend in a direction perpendicular to the first plane of the first pole piece section 112a from the first surface 113a, to a second surface 113b substantially parallel to the first plane of the first pole piece section 112a and, therefore, parallel to the armature 115. First pole piece section 112a, first portions 112c and 112e, and second portions 113 together form first pole piece 112.

The second portions 113 may have a trapezoidal cross section, but other shapes are envisaged.

Upon assembly, the first pole piece 112 is arranged so that the second surface 113b of the second portions 113 extends towards a first surface 115a of the armature 115.

Second pole piece 112b has a "C-shaped" cross section, with a ring shaped section extending in a second plane, and further comprises first portions 112d and portion 112f extending perpendicularly away from the second plane, as seen in FIG. 4. The first portions 112d, 112f of the second pole piece 112b extend from the second pole piece 112b in the same direction. Upon assembly, the second pole piece 112b is arranged so that the perpendicularly extending first portions 112d, 112f, extend towards a second surface 115b of the armature 115.

The armature 115 is therefore positioned between the second surface 113b of the second portions 113 and the perpendicularly extending first portions 112d, 112f of the second pole piece 112b.

First and second permanent magnets 114a, 114b are disposed between the first pole piece section 112a and second pole piece 112b.

Figure 3A:
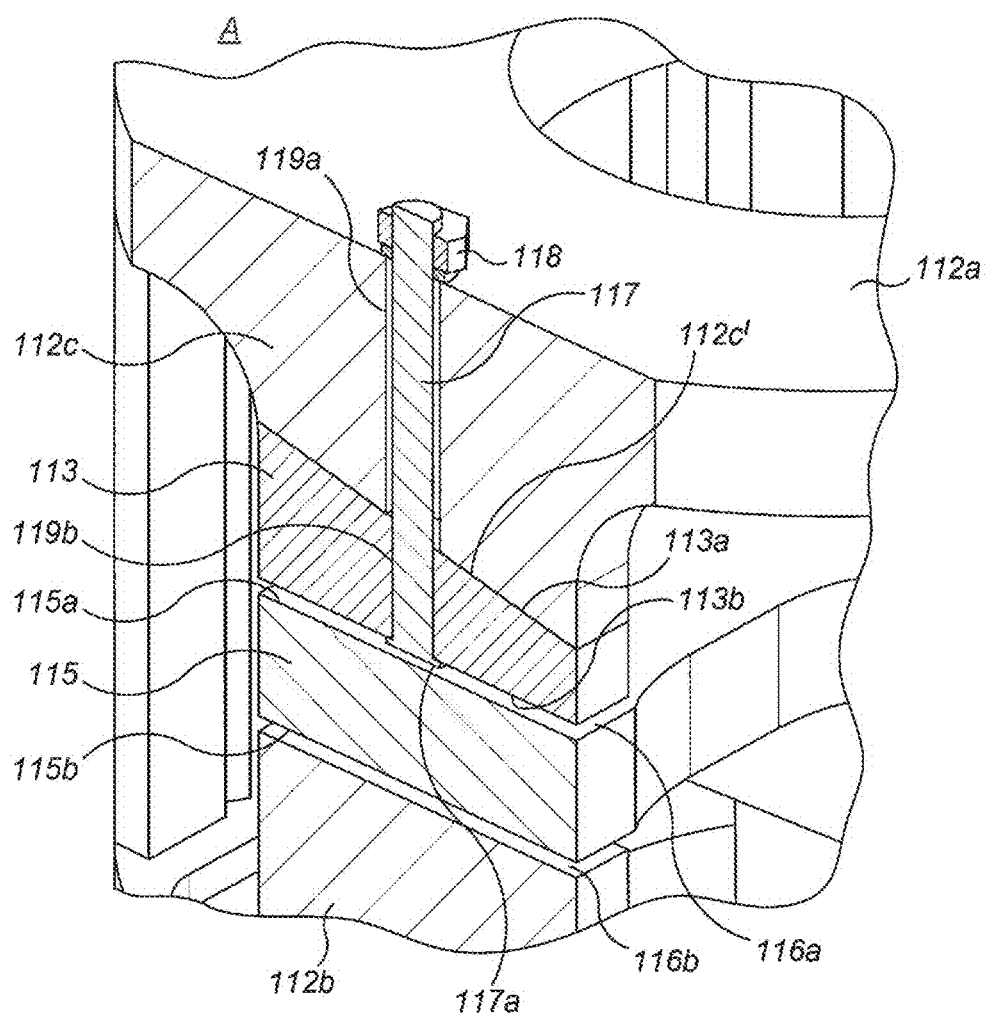
FIG. 3a shows a detailed cross sectional view of the second portion seen in section A of FIG. 3.

FIG. 3a depicts a cross section of subsection A of FIG. 3, and shows in more detail one of the second portions 113.

Attachment means 117 extends through an opening 119a in the first pole piece section 112a and the first portion 112c and an opening 119b in the second portion 113, thereby attaching second portion 113 to the first pole piece section 112a and first portion 112c. Retaining means 118 may be secured onto the attachment means 117 to secure the second portion 113.

Opening 119a may be a slot providing an area for movement of the attachment means 117, and opening 119b may have the same diameter as attachment means 117 such that the attachment means 117 is flush with the opening 119b, thereby allowing for lateral movement of the attachment means 117 and the second portion 113. Due to the angle of the angled surfaces 112c' and 112e', and the corresponding angle of the first surface 113a of the second portion 113, the movement of the second portion 113 in a direction parallel to the first plane (and a corresponding loosening or tightening of the attachment and retaining means 117, 118) will also result in a movement of the second portion 113 in a direction perpendicular to the first plane, thereby varying the magnitude of the air gap 116a. The air gap 116a between the first pole piece 112 and the armature 115 may therefore be quickly and reversibly adjusted.

Attachment means 117 may be non-magnetic, and may be provided with a hard stop 117a to prevent latching of the armature to the second portion 113. Attachment means 117 may be a threaded screw, with the end of the screw providing a hard stop 117a for the armature 115.

Retaining means 118 may be a locking nut, and further may be provided with an anti-vibration washer. Retaining means 118 may be secured with glue to prevent unwanted movement during operation.

FIG. 4 depicts a cross section of the torque motor 110. Air gap 116a is formed between a first surface 115a of the armature 115 and a second surface 113b of the second portion 113 associated with the first portion 112c of the first pole piece section 112a.

Air gap 116b is provided between a second surface 115b of the armature 115 substantially opposite to the first surface, and a first surface of the second pole piece 112b.

Air gap 116c is formed between the first surface 115a of the armature 115 and the second surface 113b of the second portion 113 associated with the first portion 112e of the first pole piece section 112a.

Air gap 116d is provided between a second surface 115b of the armature 115 substantially opposite to the first surface, and a first surface of the second pole piece 112b.

Figure 5A:
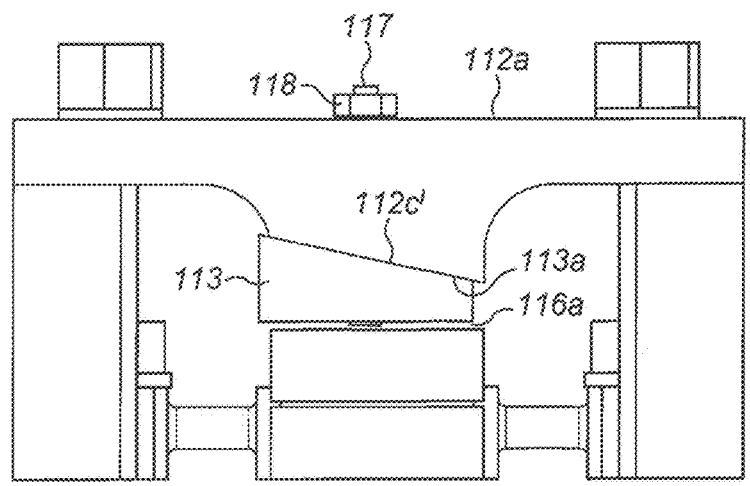
FIGS. 5a to 5c show three potential magnitudes of an adjustable air gap of the torque motor described herein.
Figure 5B:
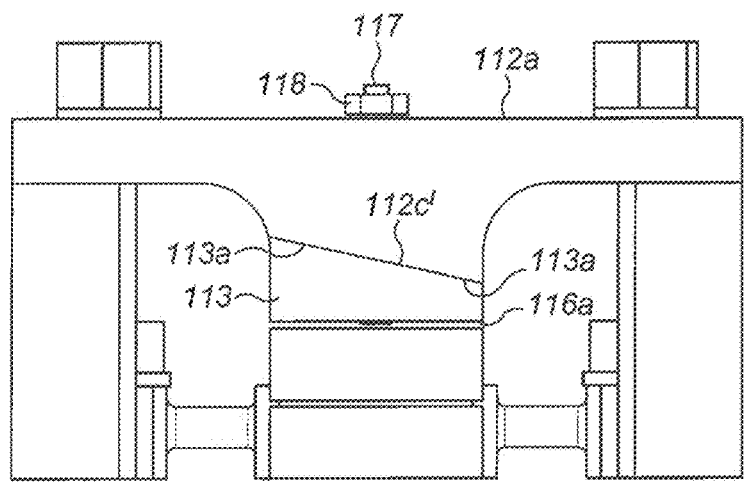
Figure 5C:
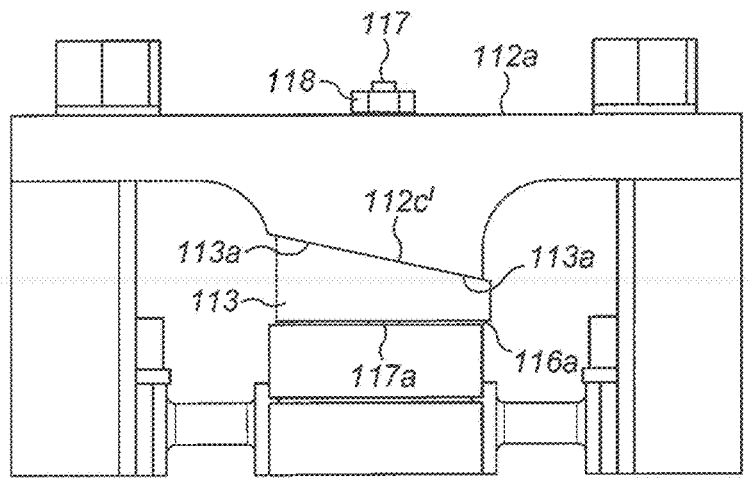

FIGS. 5a-5c show three positions of the second portion 113, and therefore three potential magnitudes of air gap 116a. The portion 113 may be moved laterally to either increase or decrease the value of air gap 116a.

As can be seen in FIG. 5a, the user has secured second portion 113 in the left-most position. This may be achieved by manually loosening the attachment means 117 and retaining means 118, and then moving the second portion 113 and therefore the attachment means 117 within the slot (not shown) to the left-most position possible. Once the second portion 113 is in the desired location (in this case, in its left-most position), the attachment means 117 and 118 may be tightened so as to secure the second portion 113 in position in relation to the first pole piece section 112a. Due to the angle of the first surface 113a of the second portion 113, and the corresponding angle of the angled surface 112c' of the first pole piece section 112a, by providing the second portion 113 at its left-most position, the air gap 116a may be at a maximal value.

As shown in FIG. 5b, the user has secured the second portion 113 in a nominal position, reducing the magnitude of the air gap 116a from the value provided by the left-most position of the second portion 113 seen in FIG. 5a. This may be achieved by manually loosening the attachment means 117 and retaining means 118, and then moving the second portion 113 and therefore the attachment means 117 within the slot (not shown) to a desired position, which may be determined by a desired value of the air gap 116a. Once the second portion 113 is in the desired location, the attachment means 117 and 118 may be tightened so as to secure the second portion 113 in position in relation to first pole piece section 112a. Due to the angle of the first surface 113a of the second portion 113, and the corresponding angle of the angled surface 112c' of the first pole piece section 112a, by providing the second portion 113 further towards the centre when compared to the position seen in FIG. 5a, the magnitude of air gap 116a may be reduced when compared to the magnitude seen in FIG. 5a.

FIG. 5c shows a minimal value of the air gap 116a. The user has secured the second portion 113 in the right-most position, reducing the magnitude of the air gap 116a to the minimum possible value. This may be achieved by manually loosening the attachment means 117 and retaining means 118, and then moving the second portion 113 and therefore the attachment means 117 within the slot (not shown) to the right-most position. Once the second portion 113 is in the desired location, the attachment means 117 and 118 may be tightened so as to secure the second portion 113 in position in relation to first pole piece section 112a. Due to the angle of the first surface 113a of the second portion 113, and the corresponding angle of the angled surface 112c' of the first pole piece section 112a, by providing the second portion 113 at its right-most position, the magnitude of air gap 116a may be reduced when compared to the magnitude seen in FIGS. 5a and 5b. As can be seen in FIG. 5c, a hard stop 117a provided with attachment means 117 may provide a physical stop to prevent latching of the armature 115 to the second portion 113.

The first surface 115a of the armature 115 and the second surface 113b of the second portion 113 may remain substantially parallel throughout movement of the second portions 113. The movement of the second portions 113 relative to the respective first portion 112c, 112e may be also in a direction substantially parallel to the first surface 113a of the second portion 113.

Although not seen in FIGS. 5a-5c, a corresponding second portion 113 associated with the first portion 112e of the first pole piece section 112a can be moved accordingly to adjust air gap 116c.

As outlined above, the sum of the opposite air gaps (16a+16d and 16b+16c) determines characteristic stroke of the armature versus current applied to the coils. By providing second portion 113 located on both the first portions 112c, 112e of first pole piece section 112a, it is possible to adjust the value of air gaps 116a and 116c, and therefore provide a single adjustable torque motor suitable for several different applications. Further, by adjusting the air gap such that the armature is not centred between the first and second pole piece, it is possible to provide a desired null position of the armature. Any adjustment to the torque motor 110 may be made quickly and reversibly.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A torque motor for a servovalve, said torque motor comprising:
   an armature;
   a first pole piece having a first portion and a second portion that is selectively moveable relative to the first portion such that a size of an air gap formed between the second portion and the armature is adjusted in response to the movement of the second portion relative to the first portion;
   wherein the second portion includes first and second surfaces;

wherein a first surface of the armature and the second surface of the second portion between which the air gap is defined remain substantially parallel throughout a range of relative movement between the first portion and the second portion;

attachment means configured to attach the second portion to the first portion; and retaining means secured onto the attachment means to secure the second portion to the first pole piece section.

2. The torque motor of claim 1, wherein movement of the second portion relative to the first portion is in a direction parallel to the first surface.

3. The torque motor of claim 1, wherein the attachment means is a screw and the retaining means is a nut.

4. The torque motor of claim 1, wherein the first pole piece and the first portion further comprise:

an opening and the second portion further comprises an opening, and wherein the attachment means is provided through the opening in the first pole piece and the first portion, and the opening in the second portion.

5. The torque motor of claim 1, wherein the opening in the first pole piece is a slot to provide an area for movement of the attachment means, and the opening in the second portion has the same diameter as the attachment means such that the attachment means is flush with the opening of the second portion.

6. A torque motor for a servovalve, said torque motor comprising:

an armature;

a first pole piece having a first portion and a second portion that is selectively moveable relative to the first portion such that a size of an air gap formed between the second portion and the armature is adjusted in response to the movement of the second portion relative to the first portion;

wherein the second portion includes first and second surfaces;

wherein a first surface of the armature and the second surface of the second portion between which the air gap is defined remain substantially parallel throughout a range of relative movement between the first portion and the second portion; and a second pole piece;

wherein the armature is disposed between the first pole piece and the second pole piece;

wherein the first pole piece further comprises a first pole piece section with a ring shape extending in a plane, wherein the first portion extends perpendicularly away from the first pole piece section to an angled surface disposed at an angle relative to the plane;

wherein the first surface is disposed at the same angle as the angled surface and the second surface is substantially parallel to the plane; and wherein the first surface of the second portion is releasably coupled to the angled surface.

7. The torque motor of claim 6, wherein the angled surfaces are disposed at an angle of between 5° and 25° to the plane.

8. A method of adjusting an air gap in a torque motor, the method comprising:

providing an armature;

providing a first pole piece having a first portion and a second portion;

selectively moving the second portion relative to the first portion such that a size of an air gap formed between the second portion and the armature is adjusted in response to the movement of the second portion relative to the first portion;

providing a second pole piece;

disposing the armature between the first pole piece and the second pole piece, wherein the first pole piece further comprises a first pole piece section with a ring shape extending in a plane, wherein the first portion extends perpendicularly away from the first pole piece section to an angled surface disposed at an angle relative to the plane, and the second portion having a first surface disposed at the same angle as the angled surface and a second surface substantially parallel to the plane; and releasably coupling the first surface of the second portion to the angled surface.

9. The method of claim 8, wherein a first surface, the armature, and a second surface of the second portion between which the air gap is defined remain substantially parallel throughout a range of relative movement between the first portion and the second portion.

10. The method of any of claim 8, further comprising moving the second portion relative to the first portion in a direction parallel to the first surface.

11. The method of any of claim 8, wherein the angled surface is disposed at an angle of between 5° and 25° to the plane.

12. The method of claim 8, further comprising providing attachment means to attach the second portion to the first portion.

13. The method of claim 12, further comprising tightening a retaining means onto the attachment means for securing the second portion to the first portion.

14. The method of claim 13, wherein the first pole piece section and first portion further comprise an opening and the second portion further comprises an opening, and the method further comprises:

providing the attachment means through the opening in the first pole piece section and the first portion, and the opening in the second portion, and wherein the opening in the first pole piece section and first section is a slot providing an area for movement of the attachment means.

15. The method of claim 14, wherein the opening in the second portion has the same diameter as the attachment means such that the attachment means is flush with the opening of the second portion.

16. The method of claim 14 further comprising:

loosening the attachment means and the retaining means, moving the second portion in a direction parallel to the plane, and therefore moving the attachment means within the opening to result in an adjustment of the air gap, tightening the attachment means and the retaining means, thereby securing the second portion in position in relation to the first portion.

* * * * *